(12) United States Patent
Ziemer (10) Patent No.: US 11,597,274 B2
(45) Date of Patent: Mar. 7, 2023

(54) TRANSMISSION AND DRIVE DEVICE FOR AN AT LEAST PARTIALLY ELECTRICALLY DRIVEN VEHICLE

(71) Applicant: ZF Friedrichshafen AG, Friedrichshafen (DE)

(72) Inventor: Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/540,573

(22) Filed: Dec. 2, 2021

(65) Prior Publication Data

US 2022/0227225 A1 Jul. 21, 2022

(30) Foreign Application Priority Data

Jan. 15, 2021 (DE) ...................... 10 2021 200 355.9

(51) Int. Cl.
*B60K 7/00* (2006.01)
*B60K 17/04* (2006.01)
*F16H 37/08* (2006.01)

(52) U.S. Cl.
CPC .......... *B60K 17/046* (2013.01); *B60K 7/0007* (2013.01); *F16H 37/0826* (2013.01); *B60K 2007/003* (2013.01); *B60K 2007/0061* (2013.01)

(58) Field of Classification Search
CPC .............. B60K 17/046; B60K 7/0007; B60K 2007/003; B60K 2007/0061; F16H 37/0826

See application file for complete search history.

(56) References Cited

U.S. PATENT DOCUMENTS

| 10,269,250 B2 | 4/2019 | Altinger et al. |
| 2020/0156483 A1 | 5/2020 | Kaneko et al. |

FOREIGN PATENT DOCUMENTS

| CN | 106004398 A | 10/2016 |
| DE | 102015002405 A1 | 8/2016 |
| DE | 102018203456 A1 * | 9/2019 |
| DE | 102018005947 A1 * | 1/2020 |
| DE | 102018129936 A1 * | 5/2020 |
| DE | 102018129936 A1 | 5/2020 |
| WO | WO 2020/108678 A1 | 6/2020 |

OTHER PUBLICATIONS

German Office Action DE 10 2021 200 355.9 dated Sep. 7, 2021 (10 pages).

* cited by examiner

*Primary Examiner* — Justin Holmes
(74) *Attorney, Agent, or Firm* — Dority & Manning, P.A.

(57) ABSTRACT

A transmission for an at least partially electrically driven vehicle includes two electric machines which are rotationally driveable in a first direction and in a second direction. The transmission further includes an output shaft at least indirectly operatively connected to the first and second electric machines, a first freewheel clutch that at least indirectly transmits a drive power of the first electric machine to the output shaft with a first ratio when the first electric machine rotates in the first direction, and a second freewheel clutch that at least indirectly transmits the drive power of the first electric machine to the output shaft with a second ratio when the first electric machine rotates in the second direction. Additionally, the transmission includes at least one first gear stage in power flow between the first or second freewheel clutch and the output shaft to rotate the output shaft in a third direction.

18 Claims, 2 Drawing Sheets

TRANSMISSION AND DRIVE DEVICE FOR AN AT LEAST PARTIALLY ELECTRICALLY DRIVEN VEHICLE

CROSS-REFERENCE TO RELATED APPLICATION

The present application is related and has right of priority to German Patent Application No. 10 2021 200 355.9 filed on Jan. 15, 2021, the entirety of which is incorporated by reference for all purposes.

FIELD OF THE INVENTION

The invention relates generally to a transmission for an at least partially electrically driven vehicle. The invention further relates generally to a drive device for a vehicle of this type and to an at least partially electrically driven vehicle having a drive device of this type or a transmission of this type.

BACKGROUND

DE 10 2015 002 405 A1 describes a vehicle having at least two electric motors and a control device, wherein the electric motors drive at least one shaft. The control device distributes a power to be provided at the at least one shaft onto the at least two electric motors as a function of the power to be provided. The particular electric motor is connected, for example, to a transmission, wherein the electric motors and the transmission are combined to form a drive train.

SUMMARY OF THE INVENTION

The present invention provides a simple and efficient transmission and a drive device for an at least partially electrically operated vehicle.

A transmission according to the invention for an at least partially electrically driven vehicle includes at least one first electric machine and one second electric machine, which are rotationally driveable in a first direction of rotation and in a second direction of rotation and are at least indirectly operatively connected to at least one output shaft, wherein a drive power of the at least one first electric machine is at least indirectly transmittable onto the particular output shaft with a first ratio in the first direction of rotation via a first freewheel clutch and with a second ratio in the second direction of rotation via a second freewheel clutch in order to drive the particular output shaft in a third direction of rotation, and wherein at least one first gear stage is arranged in the power flow between the first or second freewheel clutch and the particular output shaft in order to reverse the direction of rotation of the particular output shaft into the third direction of rotation. In other words, the transmission is a multi-motor topology, in which all electric machines are mechanically connectable or connected to the particular output shaft, wherein the electric machines transmit a drive power, individually or in combination depending on the operating situation and/or operating strategy of the vehicle and depending on the direction of rotation of the at least first electric machine, onto the particular output shaft with a certain ratio. Due to the allocation between multiple electric machines, the part load factor at the particular driving electric machine increases depending on the operating point of the vehicle, as the result of which the overall efficiency of the transmission as an overall system is optimized.

The electric machines are preferably connected to a particular accumulator or to a shared accumulator, which supplies the electric machines with electrical energy. Moreover, the electric machines are preferably controllable by a power electronics unit by an open-loop or closed-loop system. The electric machines each have a housing-affixed stator and, a rotor having a rotor shaft that is rotatable with respect to the stator, wherein the particular rotor shaft is connected in a one-piece or multi-piece manner to an input shaft, which, particularly in the case of the first electric machine, transmits a drive power at least indirectly onto the particular output shaft with a first or second ratio via the first or second freewheel clutch depending on the direction of rotation of the rotor shaft. Either the first ratio is higher than the second ratio, or vice versa.

In this context, the term "at least indirectly" is to be understood to mean that two components are (operatively) connected to each other via at least one further component, which is arranged between the two components, or are directly and, thereby, immediately connected to each other. Consequently, in some instances, even further components, which are operatively connected to the freewheel clutch or the gear stage or the output shaft, are arranged between the particular freewheel clutch and a gear stage or the output shaft.

Each electric machine has a separate efficiency map depending on the type, wherein a particular efficiency exists for each operating point of the particular electric machine. When several or all electric machines jointly contribute to the drive of the vehicle and/or transmit a torque to the drive output, at least one further efficiency map is present, which indicates a particular efficiency of the transmission arrangement at any operating point of the vehicle. In the case of different electric machines, this results in different efficiency maps and appropriate efficiencies for the particular operating point depending on the combination of the electric machines with one another. Due to the suitable switching—or deactivation or activation—of one or several electric machine(s), a drive of the vehicle that is optimal with respect to efficiency, depending on the operating point, is made possible. The open-loop control and closed-loop control of the electric machines takes place via a power electronics unit, which also relies on engine performance data and/or engine performance graphs and further loss data for this purpose.

Preferably, the electric machines are arranged in a shared transmission housing. Due to the arrangement of several electric machines in a shared main housing, the electric machines are comparatively small, i.e., having a small diameter, and so, consequently, a higher machine rotational speed and/or rotor circumferential speed of the particular electric machine is implementable. The greater the number of electric machines in the transmission arrangement, in addition, the better a torque loss is compensated for, due to the comparatively smaller machine diameter. In some instances, the electric machines are identical, i.e., having the same size, power, type, and/or having the same loss map. Alternatively, it is conceivable that the electric machines have different powers, necessary installation space volumes, types, and/or loss maps depending on the requirement on the transmission arrangement. The electric machines have, in particular, a power between 1 kilowatt (kW) and 36 kW. A higher power is also possible, depending on the application, requirement, and/or size of the vehicle. Due to a suitable combination of electric machines having different powers, a broad spectrum of operating conditions is covered, in which the particular electric machine or, when several electric machines are combined with one another, the electric machines, are each operated with an efficiency that is as high as possible.

In order to drive the vehicle in a forward direction of travel, at least the first electric machine or the first rotor shaft of the first electric machine is driven in the first direction of rotation, wherein, for a rotation of the particular input shaft in the first direction of rotation, a torque is at least indirectly transmitted from the first rotor shaft via the first freewheel clutch onto the particular output shaft, and so the particular output shaft is set into a turning motion and, in fact, into the third direction of rotation. For this purpose, the at least one first gear stage, which at least indirectly transmits the torque generated by the first electric machine to the particular output shaft with a first ratio, is preferably formed in the power flow downstream from the first freewheel clutch.

In the case of a reversal of the direction of rotation of the rotor shaft into a second direction of rotation opposite the first direction of rotation, the first freewheel clutch is automatically released, wherein no torque is transmitted via the first freewheel clutch onto the particular output shaft. Instead, for a rotation of the particular rotor shaft in the second direction of rotation, a torque is at least indirectly transmitted from the rotor shaft via the second freewheel clutch onto the particular output shaft, and so the particular output shaft is set into a turning motion. For this purpose, preferably at least one second gear stage having a second ratio, which transmits the torque generated by the first electric machine onto the particular output shaft with a second ratio, is formed in the power flow downstream from the second freewheel clutch. Therefore, the at least one first electric machine is switchable between the first ratio and the second ratio depending on the direction of rotation of the rotor shaft.

The particular freewheel clutch includes two components that are rotatable in relation to one another, in particular rings having blocking elements arranged therebetween, wherein the first component is rotationally fixed to the rotor shaft and the second component is preferably rotationally fixed to a gearwheel of the particular first gear stage. Furthermore, the blocking elements drivingly couple the rotor shaft to the particular gear stage during a rotation of the rotor shaft in the first direction of rotation or in the second direction of rotation. The freewheel clutches are any suitable freewheel clutches, in particular as a roller-type freewheel clutch or as a sprag unit. Due to the utilization of freewheel clutches, shift elements to be actively actuated are dispensed with. As a result, a simple and cost-effective transmission is provided.

In order to ensure that the particular output shaft always rotates in the third direction of rotation, which preferably corresponds to a forward direction of travel, regardless of the direction of rotation of the rotor shaft of the first electric machine, at least one gear stage situated downstream from the first or the second freewheel clutch allows a reversal of the direction of rotation of the particular output shaft to take place. Consequently, the freewheel clutches are each a clutch acting only in one direction of rotation, or a return stop.

In this sense, the at least one first gear stage having the first ratio is preferably arranged in the power flow downstream from the first freewheel clutch, wherein at least one second gear stage having a second ratio is arranged in the power flow downstream from the second freewheel clutch.

Preferably, the at least one first gear stage is drivingly connected to the at least one second gear stage, wherein the at least one second gear stage is arranged in the power flow downstream from the at least one first gear stage. Therefore, a drive power that is transmitted via the first freewheel clutch passes through both the first gear stage and the second gear stage, wherein a reversal of the direction of rotation takes place via the first gear stage. By comparison, the drive power that is transmitted via the second freewheel clutch is introduced directly into the second gear stage, which is at least indirectly operatively connected to the particular output shaft.

The at least one second electric machine is also at least indirectly operatively connected to the particular output shaft. For this purpose, the at least one second electric machine is, for example, single-stage or multi-stage and transmits a positive torque or a negative torque both in the first direction of rotation and in the second direction of rotation. Preferably, the at least one second electric machine is also, i.e., together with the at least one first electric machine, drivingly connected to the at least one second gear stage. As a result, a summation of drive power takes place at the at least one second gear stage. Moreover, it is conceivable, depending on the embodiment of the particular second electric machine, to arrange further gear stages between the particular second electric machine and the at least one second gear stage.

In particular for the case in which the vehicle is driven in a driving cycle or at an operating point with few load requests, it may be the case due to the efficiency map of the particular electric machine that an unfavorable overall efficiency exists at the particular operating point when several electric machines are presently acting upon the drive output. In order to counteract this, for example, the second electric machine is switched off or switched to a no-load condition, and so only the first electric machine transmits a drive power to the particular output shaft. Switching the particular electric machine to a no-load condition is to be understood to be a zero torque control, in which the rotor shaft is concurrently driven at the operational speed without transmitting a positive or negative torque onto the drive output. Alternatively, it is conceivable to provide a clutch between the second electric machine and the particular output shaft in order to implement a decoupling from the drive output.

Preferably, the at least one first gear stage is a planetary transmission having at least one planetary gear set. Accordingly, the planetary transmission includes a sun gear and a ring gear, wherein at least one planetary gear set having a plurality of planet gears rotatably mounted at the planet carrier is spatially arranged between the sun gear and the ring gear. According to one exemplary embodiment, the rotor shaft or the input shaft of the particular electric machine is rotationally fixed to the sun gear, wherein the planet carrier is fixedly connected to the stator of the particular electric machine. The ring gear is at least indirectly connected to the particular output shaft or to a gearwheel of the particular gear stage in order to at least indirectly transmit a torque and a rotational speed onto the particular output shaft and/or onto the particular gear stage.

It is preferred, furthermore, when at least one third gear stage is arranged in the power flow downstream from the at least one second gear stage. The at least one third gear stage is preferably a planetary transmission having at least one planetary gear set. Via the planetary transmission, a ratio is changed, in particular downstream from the summation of drive power, in order to reach a certain output speed and a certain output torque depending on the size and demand on the transmission.

The transmission is arranged, for example, in a wheel hub of a wheel of the vehicle. It is therefore a wheel hub motor, wherein such an arrangement of the at least one third gear stage or of the planetary transmission downstream from the at least one second gear stage is advantageous. In particular, a ratio of 3 or more generated by the planetary transmission is advantageous for the aforementioned application.

Preferably, at least the first and second electric machines are at least indirectly operatively connected to a differential, wherein the differential is operatively connected at least to two output shafts. A summation of all drive powers of the electric machines takes place via the differential, depending on the design of the transmission, for example, when each electric machine of the transmission has at least one separate gear stage, and so, depending on the operating point and the driving strategy, the electric machines transmit a torque onto the drive output individually or jointly.

The differential is preferably arranged coaxially to the output axis or on the output axis and distributes a drive power preferably to two output shafts. Output shafts are to be understood, with respect to the differential, to be shafts that are each at least indirectly operatively connected to a particular wheel of the vehicle, wherein a torque coming from the output shaft of the transmission and a rotational speed are transmitted onto the output shafts via the differential. Consequently, the first output shaft of the transmission is at least indirectly operatively connected to a second and a third output shaft via the differential.

According to one exemplary embodiment, at least the first electric machine is a permanent-magnet electric motor. As compared to asynchronous motors, permanent-magnet electric motors have a higher efficiency. Moreover, no drag torque is introduced in a switched-off condition of the first electric machine, due to the freewheel clutches being in the overrun mode, and so losses are reduced. Preferably, at least the second electric machine is an asynchronous motor. As compared to permanent-magnet electric motors, asynchronous motors have lower drag torques, and so power losses are minimized.

Furthermore, the transmission preferably assists travel by the vehicle in reverse. For this purpose, the operating direction at the rotor shaft of the particular first electric machine is reversed, in that, on the one hand, the torque at the particular second electric machine is reversed. Moreover, a third and a fourth freewheel clutch are operatively connected to the first rotor shaft of the particular first electric machine, which are bringable into an operative connection with the particular first rotor shaft, for example, via an axial movement by a helical-cut driving part, preferably at a spur-gear or gear-set drive. The transmission of the axial movement from one shaft onto another shaft takes place, for example, via coupled selector forks or a swing fork. In addition to the travel in reverse, a recuperation via the particular first electric machine is made possible as a result. Consequently, at least the first electric machine is operated in the generator mode, and so, by so-called recuperation, electrical energy is generated, which is stored in the particular accumulator.

According to one exemplary embodiment, the transmission includes three electric machines, which are rotationally driveable both in a first direction of rotation and in a second direction of rotation and are at least indirectly operatively connected to at least one output shaft, wherein a drive power of the first and third electric machines is at least indirectly transmittable onto the particular output shaft with a first ratio in the first direction of rotation via a respective first freewheel clutch and with a second ratio in the second direction of rotation via a respective second freewheel clutch in order to drive the particular output shaft in a third direction of rotation, and wherein at least one first gear stage for reversing the direction of rotation of the particular output shaft into the third direction of rotation is arranged in the power flow between the respective first or second freewheel clutch and the particular output shaft.

The transmission is arranged in parallel or transversely to the vehicle longitudinal axis, wherein, in particular, a transverse installation of the transmission arrangement or a transverse installation of the electric machines in the vehicle is advantageous due to the small amount of installation space needed in contrast to an in-line arrangement of electric machines that are lined up along an output axis. In the case of a longitudinal arrangement of the transmission, i.e., in parallel to the vehicle longitudinal axis, the particular output shaft is arranged transversely or perpendicular to the particular axle of the vehicle. In the case of a transverse arrangement of the transmission arrangement, i.e., transversely to the vehicle longitudinal axis, the particular output shaft is arranged in parallel, preferably coaxially, to the output axis.

A drive device according to the invention for an at least partially electrically driven vehicle includes at least one transmission according to the above-described type. An at least partially electrically driven vehicle according to the invention includes at least one such transmission according to the above-described type. The vehicle is preferably a motor vehicle, in particular an automobile (for example, a passenger car having a weight of less than 3.5 t), a bus, or a truck (bus and truck, for example, having a weight of over 3.5 t).

Preferably, the particular transmission is drivingly connected to a driven axle of the vehicle. The particular output shaft of the transmission is arranged in parallel or coaxially to the output axis or to the driven axle of the vehicle. In particular, an axle differential is provided, wherein the output shaft is connected via the differential to at least one further output shaft and preferably to two further output shafts. The two further output shafts are at least indirectly connected to at least one particular wheel of the vehicle arranged at the axle and, thereby, form the output axis. The output axis extends preferably centrally through the housing of the transmission, and so the various components of the transmission and, in fact, in particular, the at least two electric machines are arranged around the output axis and in parallel to one another. Therefore, a transmission of this type is utilized for each axle of the vehicle, in particular for the front and rear axles. As a result, separate systems are provided for the left axle half and the right axle half. Moreover, an ESP system is utilized, by which slip losses are minimized.

Alternatively, the particular transmission is integrated in a wheel hub of a wheel of the vehicle. In this case, the particular transmission has only one output shaft, which is at least indirectly connected to a wheel rim or to a tire of the particular wheel. For this purpose, the output shaft is a hollow shaft and is rotatably mounted on a wheel hub, wherein the wheel hub is arranged coaxially to the output shaft and extends through the output shaft, at least in sections. Due to the formation of wheel hub motors and drives, separate systems are also provided for the left side of the vehicle and the right side of the vehicle and/or for the front axle and the rear axle of the vehicle, in particular for each wheel individually, and so, in particular, an all-wheel drive system is provided. As a result, an ESP system is also implemented in order to minimize slip. Moreover, so-called torque vectoring is possible, in which each wheel is acted upon individually with a positive torque or a negative torque, and so the driving safety of the vehicle is increased. In addition, part load conditions are further optimized, for example, in that the wheels of only one axle are driven, while the wheels of the particular other axle are concurrently driven without load.

In addition, low drops in tractive force during gear changes are implemented and, in fact, in that the gear changes of the wheel hub motors or of the particular transmission integrated in the wheel are carried out one after the other, and so, during a gear change operation of a (wheel hub) transmission, at least one other (wheel hub) transmission, which does not contribute to the shifting process, transmits a drive power onto the drive output. One further advantage is that installation space is gained in the vehicle, since the particular transmission is integrated into the interior space of the particular wheel.

The definitions presented above and comments presented regarding technical effects, advantages, and advantageous embodiments of the transmission according to the invention also apply similarly for the drive device according to the invention and for the at least partially electrically driven vehicle according to the invention, and vice versa.

BRIEF DESCRIPTION OF THE DRAWINGS

Exemplary embodiments of the invention are explained in greater detail in the following with reference to the diagrammatic drawings, wherein identical or similar elements are labeled with the same reference numbers, wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
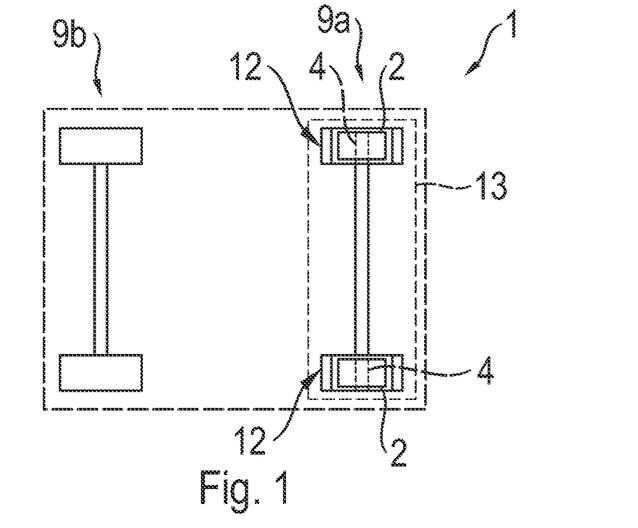
FIG. 1 shows a schematic top-down view of a vehicle including a first embodiment of a transmission according to example aspects of the invention.

FIG. 1 shows an electrically driven vehicle 1 having two axles, including a first axle 9a and a second axle 9b, where a drive device 13 is at one of the axles, particularly at the first axle 9a. Wheels 12 are rotatably arranged at the ends of the first axle 9a. A transmission 2 is arranged within or integrated into each wheel 12 of the axle 9a of the drive device 13, with each wheel 12 being a so-called "wheel hub motor." The particular transmission 2 is described with reference to FIGS. 2a-3b on the basis of two exemplary embodiments, however, only one wheel 12 is represented in each case, with the particular other wheel 12 of the axle 9a being identical.

It is also conceivable that all wheels 12 of the vehicle 1 include a transmission 2 integrated therein and/or that the transmissions 2 of the wheels 12 differ, in particular, with respect to performance.

Alternatively, only one transmission 2 is arranged at one or all axle(s) 9a, 9b of the vehicle 1, wherein the particular transmission 2 is drivingly connected to the associated axle 9a, 9b of the vehicle 1, and so the particular axle 9a, 9b is a driven axle. In this case, the transmission 2 is connected to the particular axle 9a, 9b via a differential (not shown here) and connects an output shaft 4 (shown in FIGS. 2a-3b) of the particular transmission 2 to two further output shafts, each of which is at least indirectly operatively connected to a respective wheel 12. In this type of arrangement of the transmission 2 in the drive device 13, the configuration of the transmission 2 essentially corresponds to the exemplary embodiments represented in the following.

The electric machines 3a, 3b shown in FIGS. 2a-3b are electrically connected to an accumulator (not represented here), which supplies the electric machines 3a, 3b with electrical energy. The open-loop and/or closed-loop control of the electric machines 3a, 3b takes place, furthermore, via a power electronics unit (also not represented here).

Figure 2A:
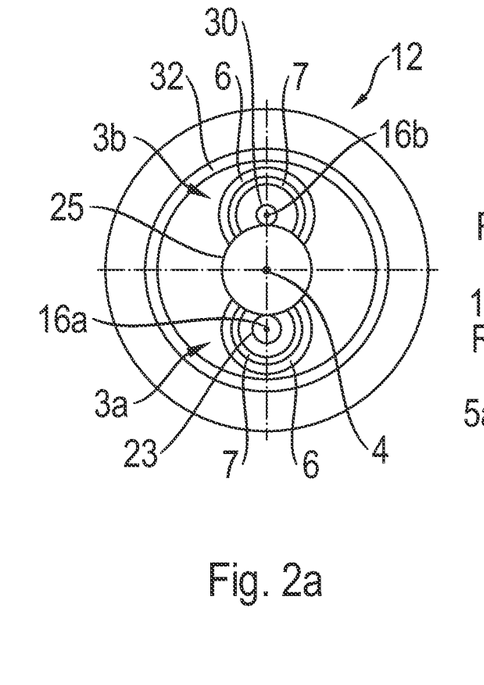
FIG. 2a shows a schematic cross-sectional view of the transmission shown in FIG. 1 according to example aspects of the invention.
Figure 2B:
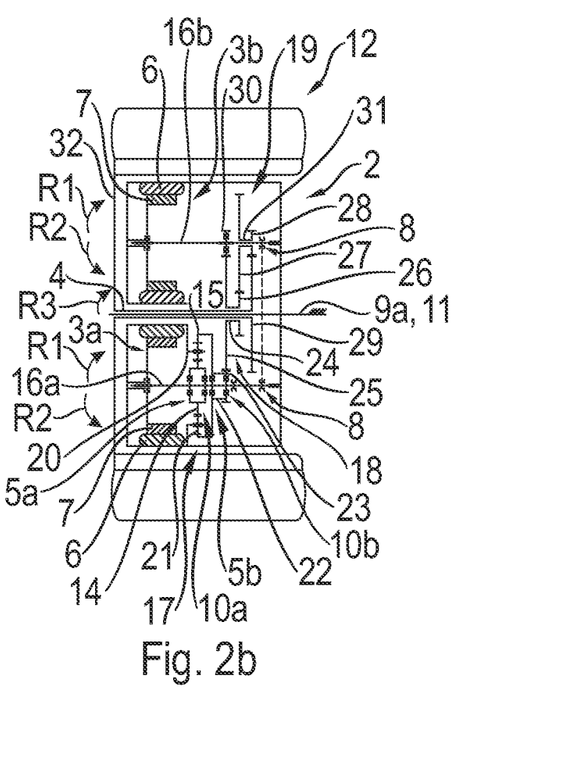
FIG. 2b shows a schematic longitudinal sectional view of the transmission shown in FIGS. 1 and 2a according to example aspects of the invention.

According to the first exemplary embodiment according to FIG. 2a and FIG. 2b, the transmission 2 is a wheel hub motor that includes a first electric machine 3a and a second electric machine 3b, each of which has a fixed stator 6 and a rotor 7 arranged so as to be rotatable with respect thereto. The rotor 7 of each electric machine 3a, 3b is connected to a respective rotor shaft 16a, 16b, with the rotor shaft 16a, 16b being rotationally driveable both in a first direction of rotation R1 and in an opposite, second direction of rotation R2. The first electric machine 3a is a permanent-magnet electric motor in the present case and the second electric machine 3b is an asynchronous motor.

The first rotor shaft 16a of the first electric machine 3a is operatively connected to a first freewheel clutch 5a and a second freewheel clutch 5b. Depending on the direction of rotation R1, R2 of the particular rotor shaft 16a, 16b, a drive power of the at least one first electric machine 3a is at least indirectly transmittable onto the output shaft 4, for instance, with a first ratio in the first direction of rotation R1 via the first freewheel clutch 5a and with a second ratio in the second direction of rotation R2 via the second freewheel clutch 5b. The particular ratio is achieved in that at least one gear stage is arranged, as described in the following, in the power flow downstream from the freewheel clutches 5a, 5b.

According to FIG. 2b, during a rotation of the first rotor shaft 16a in the first direction of rotation R1, a drive power from the rotor shaft 16a is transmitted via the first freewheel clutch 5a onto a first gear stage 17, the first gear stage 17 being a planetary transmission. In the process, a first ratio is provided. On the part of the first gear stage 17, the first freewheel clutch 5a is at least indirectly rotationally fixed to a sun gear 14 of the first gear stage 17, wherein the drive power acting at the sun gear 14 is transmitted onto a first intermediate shaft 22 via a rotatably mounted ring gear 15 of the first gear stage 17. For this purpose, a housing-affixed planet carrier 20 having multiple planet gears 21 rotatably mounted at the planet carrier 20 is spatially arranged between the sun gear 14 and the ring gear 15, wherein the planet gears 21 are meshed with the sun gear 14 and the ring gear 15.

The first intermediate shaft 22 is therefore rotationally fixed to the ring gear 15 and is also operatively connected to the second freewheel clutch 5b. During a rotation of the first rotor shaft 16a in the first direction of rotation R1, the second freewheel clutch 5b transmits no drive power, i.e., no torque and also no rotational speed, onto the first intermediate shaft 22. Similarly, during a rotation of the first rotor shaft 16a in the second direction of rotation R2, the first freewheel clutch 5a transmits no drive power onto the first intermediate shaft 22. In contrast thereto, upon a reversal of the direction of rotation of the first rotor shaft 16a into the second direction of rotation R2, the second freewheel clutch 5b transmits a drive power onto the first intermediate shaft 22. In the process, a second ratio is provided, which is not equal to the first ratio, and so a drive of the vehicle 1 with different transmission ratios is implementable solely via the first electric machine 3a as a function of the direction of rotation R1, R2 of its first rotor shaft 16a.

The first intermediate shaft 22 is drivingly connected, via a first gearwheel 23 rotationally fixed thereto, to a second gear stage 18. The second gear stage 18 includes a first countershaft 24 having a second gearwheel 25, and a third gearwheel 26 rotationally fixed thereto. The first gearwheel 23 is meshed with the second gearwheel 25. Therefore, the second gear stage 18 is arranged in the power flow downstream from the first gear stage 17. The first countershaft 24 is operatively connected to a third gear stage 19 including a second countershaft 31 having a fourth gearwheel 27, and a fifth gearwheel 28 arranged thereon in a rotationally fixed manner. The third gearwheel 26 of the second gear stage 18 is meshed with the fourth gearwheel 27 of the third gear stage 19. The fifth gearwheel 28 is meshed with a sixth gearwheel 29, which is rotationally fixed to the output shaft 4. Therefore, the third gear stage 19 is arranged in the power flow downstream from the second gear stage 18.

Via the first gear stage 17, a reversal of the direction of rotation is achieved, and so, regardless of the direction of rotation R1, R2 of the first rotor shaft 16a, the output shaft 4 always rotates in the same direction of rotation, although with the first or second ratio depending on the direction of rotation R1, R2. Consequently, in a transmission operation corresponding to the forward direction of travel, the output shaft 4 rotates in a third direction of rotation R3 corresponding to the first direction of rotation R1. Therefore, the first electric machine 3a is indirectly drivingly coupleable to the output shaft 4, in the forward direction of travel, either via the first or the second freewheel clutch 5a, 5b as a function of the direction of rotation R1, R2 of the first rotor shaft 16a. The output shaft 4 is rotationally fixed to a wheel rim 32 of the wheel 12 in order to drive the vehicle 1 in the forward direction of travel.

In the present exemplary embodiment, the second rotor shaft 16b of the second electric machine 3b has a fixed ratio and is rotationally fixed to a seventh gearwheel 30, which, similarly to the first gearwheel 23 of the first intermediate shaft 22, is meshed with the second gearwheel 25 of the second gear stage 18. In other words, a summation of drive power takes place at the second gearwheel 25 of the first countershaft 24 when both electric machines 3a, 3b generate a torque acting in the same direction and when the second rotor shaft 16b rotates in the second direction of rotation R2.

If the second rotor shaft 16b rotates in the opposite, first direction of rotation R1, travel by the vehicle 1 in reverse is initiable. For this purpose, the first rotor shaft 16a is, furthermore, operatively connected to a third freewheel clutch 10a and a fourth freewheel clutch 10b. Via two coupled selector forks 8, an axial movement is carried out by a helical-cut driving part (not shown here in greater detail) at a spur-gear or gear-set drive arranged at the second rotor shaft 16b, which mechanically activates the third and the fourth freewheel clutches 10a, 10b and mechanically deactivates the first and the second freewheel clutches 5a, 5b. As a result, the operating direction at the first rotor shaft 16a is reversed, and so an assistance of reverse travel by the first electric machine 3a in addition to the second electric machine 3b is possible. Moreover, recuperation at the first electric machine 3a is possible, as a function of the direction of rotation of the intermediate shaft 22, due to the reversal of the operating direction taking place via the third and the fourth freewheel clutches 10a, 10b.

In the present case, the first intermediate shaft 22 is a hollow shaft and is arranged coaxially to the first rotor shaft 16a, which is passed through the first intermediate shaft 22. The first countershaft 24 is also a hollow shaft and is arranged coaxially to the wheel hub 11 and to the axle 9a. The output shaft 4 is also a hollow shaft and is arranged coaxially to the axle 9a and to the first countershaft 24. The second countershaft 31 is a hollow shaft and is rotatably mounted on the second rotor shaft 16b, which is arranged coaxially to the second countershaft 31.

In this exemplary embodiment, therefore, essentially three gear steps are implementable in the particular transmission 2. A gear step is to be understood to be a drive of the vehicle 1 with a certain transmission ratio, wherein the transmission ratio of each gear step is different from the transmission ratio of the particular other gear step.

In a first gear step, for example, only the first electric machine 3a generates a drive power and, in fact, in such a way that the first rotor shaft 16a is rotationally driven in the first direction of rotation R1 and transmits the drive power onto the output shaft 4 via the first freewheel clutch 4a and all three gear stages 17, 18, 19 in succession. The second electric machine 3b is either switched off or switched to a no-load condition in this case.

In a second gear step, the second electric machine 3b is switched to an active condition, and so the drive power is transmitted exclusively via the second rotor shaft 16b of the second electric machine 3b, whereas the first electric machine 3a is either switched off or switched to a no-load condition.

The third gear step is implemented in that the second electric machine 3b is once again switched off or switched to a no-load condition and the first rotor shaft 16a rotates in the second direction of rotation R2, and so the drive power is transmitted onto the output shaft 4 via the second freewheel clutch 5b and the second and the third gear stages 18, 19.

A changeover from the first gear step into the third gear step, or vice versa, takes place, for example, with assistance by the second electric machine 3b and, thereby, essentially in a power shiftable manner. As a result, tractive force interruptions and torque losses are avoided and the drive of the vehicle 1 and the gear ratio change from the first gear step into the third gear step, or vice versa, take place in a manner that is particularly pleasant and/or unobtrusive for the driver of the vehicle 1.

In addition, it is conceivable to utilize both electric machines 3a, 3b jointly or in parallel for a drive of the vehicle 1. As a result, due to the above-described summation of drive power at the second gearwheel 25, higher torques are implementable, which are adjustable according to the requirements on the drive depending on the direction of rotation R1, R2 of the first rotor shaft 16a.

Figure 3A:
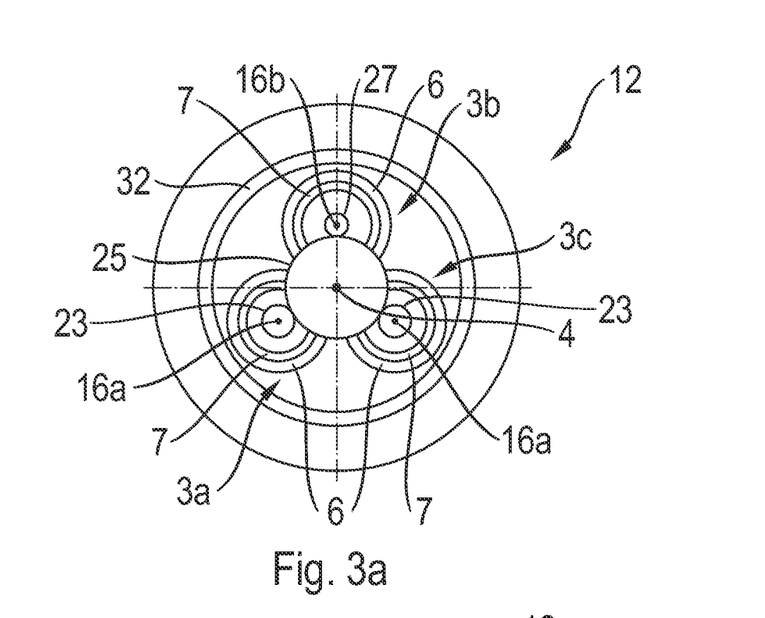
FIG. 3a shows a schematic cross-sectional view of a second embodiment of a transmission according to the invention.
Figure 3B:
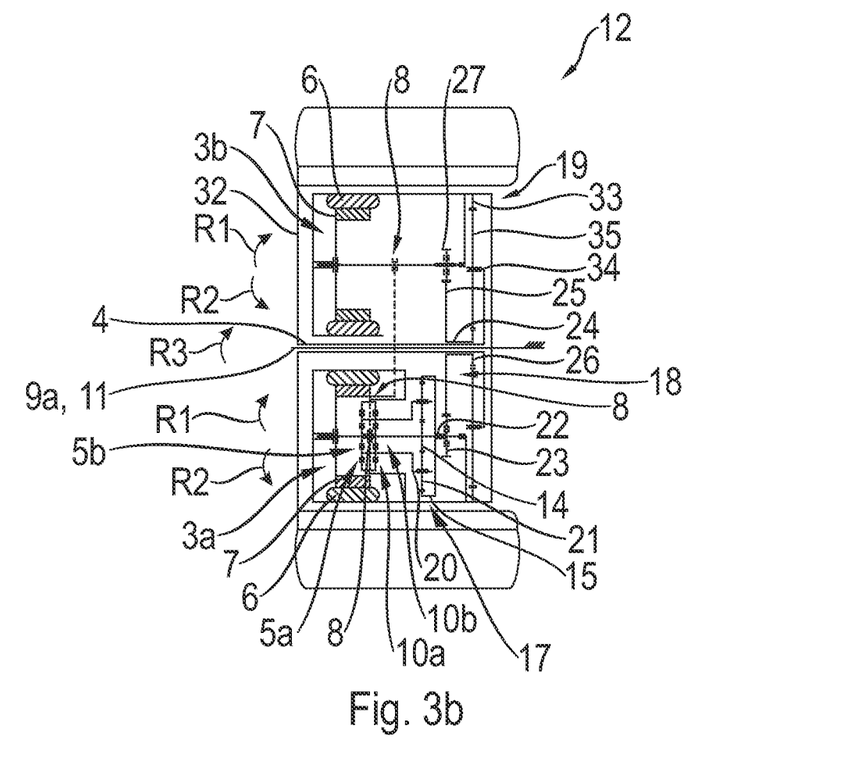
FIG. 3b shows a schematic longitudinal sectional view of the transmission shown in FIG. 3a according to example aspects of the invention.

According to a second exemplary embodiment according to FIG. 3a and FIG. 3b, the transmission 2, which is also a wheel hub motor, includes three electric machines, including a first electric machine 3a, a second electric machine 3b, and a third electric machine 3c, each having a fixed stator 6 and a rotor 7 rotatable with respect to the stator 6. In FIG. 3b, only the first and the second electric machines 3a, 3b are shown, wherein the third electric machine 3c is identical to the first electric machine 3a. The rotor 7 of each electric machine 3a, 3b, 3c is connected to a respective rotor shaft 16a, 16b, which is rotationally driveable both in a first direction of rotation R1 and in an opposite, second direction of rotation R2. The first and the third electric machines 3a, 3c are permanent-magnet electric motors in the present case and the second electric machine 3b is an asynchronous motor.

The first rotor shaft 16a of the first electric machine 3a is operatively connected to a first and a second freewheel clutch 5a, 5b. During a rotation of the first rotor shaft 16a in the first direction of rotation R1, a drive power from the first rotor shaft 16a is transmitted via the first freewheel clutch 5a onto a first gear stage 17, with the first gear stage 17 being a planetary transmission, wherein the first gear stage 17 provides a first ratio.

During a rotation of the first rotor shaft 16a in the first direction of rotation R1, the first freewheel clutch 5a arranges the planet carrier 20 in a rotationally fixed manner with respect to the stator 6 and, thereby, in a housing-affixed manner, and so the drive power applied at a sun gear 14 via the first rotor shaft 16a is transmitted onto the ring gear 15 with a first ratio via the planet gears 21. During a rotation of the first rotor shaft 16a in the second direction of rotation R2, a second ratio takes place and, in fact, a 1:1 ratio, at which the planet carrier 20 is rotationally fixed to the sun gear 14 of the first gear stage 17 via the second freewheel clutch 5b, and so the planet carrier 20 and the sun gear 14 rotate at the same speed. Consequently, a drive power coming from the first rotor shaft 16a and applied at the planet carrier 20 via the second freewheel clutch 5b is transmitted onto a first intermediate shaft 22 with the second ratio via a rotatably mounted ring gear 15, wherein planet gears 21, which are rotatably mounted at the planet carrier 20, are spatially arranged between the sun gear 14 and the ring gear 15, wherein the planet gears 21 are meshed with the sun gear 14 and the ring gear 15. The first intermediate shaft 22 is therefore rotationally fixed to the ring gear 15. The intermediate shaft 22 is therefore operatively connectable to the first or the second freewheel clutch 5a, 5b depending on the direction of rotation R1, R2 of the first rotor shaft 16a, and so a drive of the vehicle 1 with different transmission ratios is implemented via the first electric machine 3a as a function of the direction of rotation R1, R2 of the first rotor shaft 16a.

The first intermediate shaft 22 is drivingly connected to a second gear stage 18 via a first gearwheel 23, which is rotationally fixed to the first intermediate shaft 22. The second gear stage 18 includes a first countershaft 24, a second gearwheel 25, and a third gearwheel 26 rotationally fixed thereto. The first gearwheel 23 is meshed with the second gearwheel 25 of the second gear stage 18. Therefore, the second gear stage 18 is arranged in the power flow downstream from the first gear stage 17. The first countershaft 24 of the second gear stage 18 is operatively connected to a third gear stage 19, the third gear stage 19 being a planetary transmission, wherein the third gearwheel 26 functions as a sun gear of the third gear stage 19.

The drive output at the third gear stage 19 takes place via a planet carrier 34, which is rotationally fixed to the output shaft 4, wherein a plurality of planet gears 35, which are meshed with the third gearwheel 26 and with a housing-affixed ring gear 33, the third gearwheel 26 being a sun gear, are rotatably mounted at the planet carrier 34. Therefore, the third gear stage 19 is arranged in the power flow downstream from the second gear stage 18.

Via the first gear stage 17, a reversal of the first direction of rotation R1 of the first rotor shaft 16a into a second direction of rotation R2 is achieved, and so, regardless of the direction of rotation R1, R2 of the first rotor shaft 16a, the output shaft 4 always rotates in the same direction of rotation, although with the first or second ratio depending on the direction of rotation R1, R2 of the first rotor shaft 16a. Consequently, the output shaft 4 always rotates in a third direction of rotation R3 in a transmission operation corresponding to the forward direction of travel. Therefore, the first electric machine 3a is indirectly drivingly coupleable to the output shaft 4 either via the first or the second freewheel clutch 5a, 5b as a function of the direction of rotation R1, R2 of the first rotor shaft 16a in the forward direction of travel. The output shaft 4 is rotationally fixed to a wheel rim 32 of the wheel 12 in order to drive the vehicle 1 in the forward direction of travel.

In the present exemplary embodiment, the second rotor shaft 16b of the second electric machine 3b has a fixed ratio and is rotationally fixed to a fourth gearwheel 27, which is meshed with the second gearwheel 25 of the second gear stage 18, as is also the case with the first gearwheel 23 of the first intermediate shaft 22. In other words, a summation of drive power takes place at the second gearwheel 25 of the first countershaft 24 when the three electric machines 3a, 3b, 3c generate a torque acting in the same direction, in particular when the second rotor shaft 16b rotates in the second direction of rotation R2.

If the second rotor shaft 16b rotates in the opposite, first direction of rotation R1, travel by the vehicle 1 in reverse is initiable. For this purpose, the first rotor shaft 16a is, furthermore, operatively connected to a third freewheel clutch 10a and a fourth freewheel clutch 10b. Via two coupled selector forks 8, an axial movement is carried out by a helical-cut driving part (not shown here in greater detail) at a spur-gear or gear-set drive arranged at the second rotor shaft 16b, which mechanically activates the third and the fourth freewheel clutches 10a, 10b and mechanically deactivates the first and the second freewheel clutches 5a, 5b. As a result, the operating direction at the first rotor shaft 16a is reversed, and so an assistance of travel in reverse by the first electric machine 3a in addition to the second electric machine 3b is possible. Moreover, a recuperation at the first electric machine 3a, as a function of the direction of rotation of the intermediate shaft 22, is possible due to the reversal of the operating direction taking place via the third and the fourth freewheel clutches 10a, 10b.

In the present case, the first intermediate shaft 22 is a hollow shaft and is arranged coaxially to the first rotor shaft 16a, which is passed through the first intermediate shaft 22. The first countershaft 24 is also a hollow shaft and is arranged coaxially to the wheel hub 11 and/or to the axle 9a. The output shaft 4 is also a hollow shaft and is arranged coaxially to the axle 9a and to the first countershaft 24.

In this exemplary embodiment, essentially five gear steps are implementable in the transmission 2 due to the three electric machines 3a, 3b, 3c. In a first gear step, only the first electric machine 3a generates a drive power and, in fact, in such a way that the first rotor shaft 16a is rotationally driven in the first direction of rotation R1 and transmits the drive power onto the output shaft 4 via the particular first freewheel clutch 5a, the planet carrier 20, and all three gear stages 17, 18, 19 in succession. The second and the third electric machines 3b, 3c are either switched off or switched to a no-load condition in this case.

A second gear step is implemented in that the third electric machine 3c is switched to an active condition with a gear stage that is higher as compared to the first electric machine 3a, and so the drive power is generated exclusively via the third electric machine 3c and transmitted onto the output shaft 4 by the first rotor shaft 16a via the first freewheel clutch 5a of the third electric machine 3c, the planet carrier 20, and all three gear stages 17, 18, 19 in succession, whereas the first electric machine 3a and the second electric machine 3b are either switched off or switched to a no-load condition.

In a third gear step, the second electric machine 3b is switched to an active condition, and so the drive power is transmitted exclusively via the second rotor shaft 16b of the second electric machine 3b, whereas the first and the third electric machines 3a, 3c are either switched off or switched to a no-load condition.

The fourth gear step is present when the first electric machine 3a is activated and the first rotor shaft 16a is rotated in the second direction of rotation R2, wherein the second ratio is provided via the particular second freewheel clutch 5b. In the process, the second and the third electric machines 3b, 3c are switched off. Consequently, the drive power is transmitted onto the output shaft 4 via the second freewheel clutch 5b of the first electric machine 3a, the sun gear 14 of the particular first gear stage 17, which is interlocked with the planet carrier 20 and the ring gear 15, and the two further gear stages 18, 19.

By comparison, in the fifth gear step, the third electric machine 3c is activated and its first rotor shaft 16a is rotated in the second direction of rotation R2, wherein the second ratio is provided via the particular second freewheel clutch 5b. In the process, the first and the second electric machines 3a, 3b are switched off. Consequently, the drive power is transmitted onto the output shaft 4 via the second freewheel clutch 5b of the third electric machine 3c, the sun gear 14 of the particular first gear stage 17, which is interlocked with the planet carrier 20 and the ring gear 15, and the two further gear stages 18, 19.

A changeover from the first gear step into the fourth gear step, or vice versa, and a changeover from the second gear step into the fifth gear step, or vice versa, are assisted, for example, by the second electric machine 3b and, thereby, take place essentially in a power shiftable manner. As a result, tractive force interruptions and torque losses are avoided and the drive of the vehicle 1 and the gear ratio change from the first gear step into the fourth gear step, or vice versa, and from the second gear step into the fifth gear step, or vice versa, take place in a manner that is particularly pleasant and/or unobtrusive for the driver of the vehicle 1.

In addition, it is conceivable to combine the electric machines 3a, 3b, 3c in any way and/or simultaneously switch the electric machines 3a, 3b, 3c to an active condition for the drive of the vehicle 1. In other words, two, three, or all electric machines 3a, 3b, 3c generate a drive power and transmit the drive power onto the output shaft 4 in the above-described way. As a result, due to the summation of drive power at the second gearwheel 25, higher torques are implementable, which are adjustable according to the requirements on the drive depending on the direction of rotation R1, R2 of the particular first rotor shaft 16a of the first and/or the third electric machine(s) 3a, 3c. It is advantageous that the electric machines 3a, 3b, 3c are operable close to an optimal efficiency in all stationary operating conditions.

Since multiple wheels 12 of the vehicle 1 have a transmission 2 of the above-described type, if one or several transmission(s) 2 is/are below a certain efficiency or if the vehicle 1 falls below a certain speed limiting value, one or several transmission(s) 2 are deactivated, and so the vehicle 1 is driven, for example, only via one wheel 12 and/or via the transmission 2 arranged in this wheel 12, in particular via only one electric machine 3a, 3b, 3c integrated in this transmission 2. Similarly, one or several transmission(s) 2 are activated if higher power requirements are desired.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle
2 transmission
3a first electric machine
3b second electric machine
3c third electric machine
4 output shaft
5a first freewheel clutch
5b second freewheel clutch
6 stator
7 rotor
8 selector fork
9a first axle
9b second axle
10a third freewheel clutch
10b fourth freewheel clutch
11 wheel hub
12 wheel
13 drive device
14 sun gear of the first gear stage
15 ring gear of the first gear stage
16a first rotor shaft
16b second rotor shaft
17 first gear stage
18 second gear stage
19 third gear stage
20 planet carrier of the first gear stage
21 planet gear of the first gear stage
22 first intermediate shaft
23 first gearwheel
24 first countershaft
25 second gearwheel
26 third gearwheel
27 fourth gearwheel
28 fifth gearwheel
29 sixth gearwheel
30 seventh gearwheel
31 second countershaft
32 wheel rim
33 ring gear of the third gear stage
34 planet carrier of the third gear stage
35 planet gear of the third gear stage
R1 first direction of rotation R2 second direction of rotation
R3 third direction of rotation

The invention claimed is:

1. A wheel hub motor (2) for a wheel hub (11) of an at least partially electrically driven vehicle (1), comprising:
a first electric machine (3a) and a second electric machine (3b), each of the first and second electric machines (3a, 3b) being rotationally driveable in a first direction of rotation (R1) and in a second direction of rotation (R2), the first electric machine (3a) and the second electric machine (3b) being parallel;
an output shaft (4) at least indirectly operatively connected to the first electric machine (3a) and the second electric machine (3b), the output shaft (4) being a hollow shaft, the first electric machine (3a) and the second electric machine (3b) being spaced apart from the output shaft (4) and being spaced apart from each other about the output shaft (4);
a first freewheel clutch (5a) that at least indirectly transmits a drive power of the first electric machine (3a) to the output shaft (4) with a first ratio when the first electric machine (3a) rotates in the first direction of rotation (R1);
a second freewheel clutch (5b) that at least indirectly transmits the drive power of the first electric machine (3a) to the output shaft (4) with a second ratio when the first electric machine (3a) rotates in the second direction of rotation (R2); and
at least one first gear stage (17) in power flow between the first freewheel clutch (5a) or the second freewheel clutch (5b) and the output shaft (4) to drive the output shaft (4) in a third direction of rotation (R3).

2. The wheel hub motor (2) of claim 1, further comprising at least one second gear stage (18),
wherein the at least one first gear stage (17) is in the power flow downstream from the first freewheel clutch (5a), and
wherein the at least one second gear stage (18) is in the power flow downstream from the second freewheel clutch (5b).

3. The wheel hub motor (2) of claim 2, wherein the at least one first gear stage (17) is drivingly connected to the at least one second gear stage (18), and
wherein the at least one second gear stage (18) is in the power flow downstream from the at least one first gear stage (17).

4. The wheel hub motor (2) of claim 3, wherein the second electric machine (3b) is also drivingly connected to the at least one second gear stage (18).

5. The wheel hub motor (2) of claim 3, further comprising at least one third gear stage (19) in the power flow downstream from the at least one second gear stage (18).

6. The wheel hub motor (2) of claim 5, wherein the at least one third gear stage (19) is a planetary transmission having at least one planetary gear set.

7. The wheel hub motor (2) of claim 1, wherein the at least one first gear stage (17) is a planetary transmission having at least one planetary gear set.

8. The wheel hub motor (2) of claim 1, further comprising a differential indirectly operatively connected to the first and the second electric machines (3a, 3b), wherein the differential operatively connects the output shaft (4) to two further output shafts.

9. The wheel hub motor (2) of claim 1, wherein the first electric machine (3a) is a permanent-magnet electric motor.

10. The wheel hub motor (2) of claim 1, wherein the second electric machine (3a) is an asynchronous motor.

11. A drive device (13) for an at least partially electrically driven vehicle (1), comprising the wheel hub motor (2) of claim 1.

12. An at least partially electrically driven vehicle (1), comprising the wheel hub motor (2) of claim 1.

13. The vehicle (1) of claim 12, further comprising a driven axle (9a), wherein the wheel hub motor (2) is operatively connected to the driven axle (9a).

14. The vehicle (1) of claim 12, further comprising a wheel (12) having a wheel hub (11),
wherein the wheel hub motor (2) is integrated into the wheel hub (11).

15. The vehicle (1) of claim 14, wherein the output shaft (4) is rotatably mounted on the wheel hub (11), the output shaft (4) being coaxial with the wheel hub (11).

16. The wheel hub motor (2) of claim 1, wherein the first and second electric machines (3a, 3b) are positioned opposite each other about the output shaft (4).

17. A transmission (2) for an at least partially electrically driven vehicle (1), comprising:
a first electric machine (3a), a second electric machine (3b), and a third electric machine (3c), each of the first, second, and third electric machines (3a, 3b, 3c) being rotationally driveable in a first direction of rotation (R1) and in a second direction of rotation (R2);
an output shaft (4) at least indirectly operatively connected to the first, second, and third electric machines (3a, 3b, 3c);
a first freewheel clutch (5a) of the first electric machine (3a) that at least indirectly transmits a drive power of the first electric machine (3a) to the output shaft (4) with a first ratio when the first electric machine (3a) rotates in the first direction of rotation (R1);
a first freewheel clutch (5a) of the third electric machine (3c) that at least indirectly transmits a drive power of the third electric machine (3c) to the output shaft (4) with the first ratio when the third electric machine (3c) rotates in the first direction of rotation (R1);
a second freewheel clutch (5b) of the first electric machine (3a) that at least indirectly transmits the drive power of the first electric machine (3a) to the output shaft (4) with a second ratio when the first electric machine (3a) rotates in the second direction of rotation (R2);
a second freewheel clutch (5b) of the third electric machine (3c) that at least indirectly transmits the drive power of the third electric machine (3c) to the output shaft (4) with the second ratio when the third electric machine (3c) rotates in the second direction of rotation (R2); and
a first gear stage (17) arranged in power flow between the first freewheel clutch (5a) or the second freewheel clutch (5b) of each of the first and second electric machines (3a, 3b) and the output shaft (4) to drive the output shaft (4) in a third direction of rotation (R3).

18. An at least partially electrically driven vehicle (13), comprising:
a wheel (12) having a wheel hub (11); and
a wheel hub motor (2) integrated into the wheel hub (11), the wheel hub motor (2) comprising:
a first electric machine (3a) and a second electric machine (3b), each of the first and second electric machines (3a, 3b) being rotationally driveable in a first direction of rotation (R1) and in a second direction of rotation (R2);

an output shaft (4) at least indirectly operatively connected to the first electric machine (3*a*) and the second electric machine (3*b*);
a first freewheel clutch (5*a*) that at least indirectly transmits a drive power of the first electric machine (3*a*) to the output shaft (4) with a first ratio when the first electric machine (3*a*) rotates in the first direction of rotation (R1);
a second freewheel clutch (5*b*) that at least indirectly transmits the drive power of the first electric machine (3*a*) to the output shaft (4) with a second ratio when the first electric machine (3*a*) rotates in the second direction of rotation (R2); and
at least one first gear stage (17) in power flow between the first freewheel clutch (5*a*) or the second freewheel clutch (5*b*) and the output shaft (4) to drive the output shaft (4) in a third direction of rotation (R3).

\* \* \* \* \*